United States Patent Office 3,493,751
Patented Feb. 3, 1970

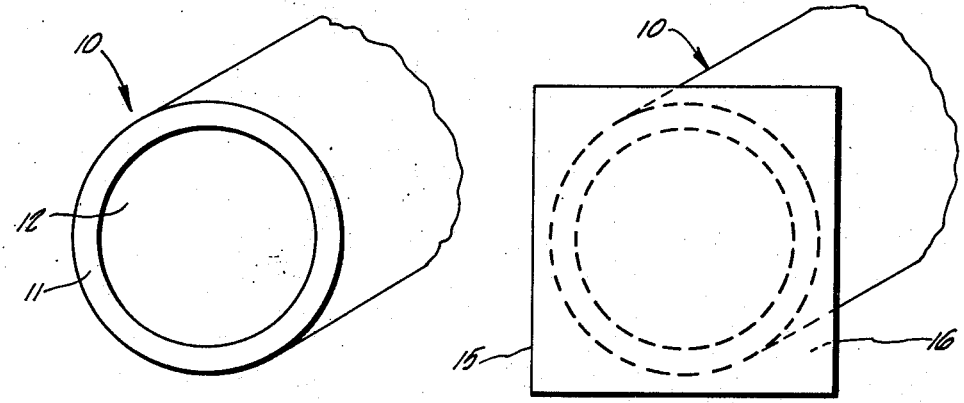
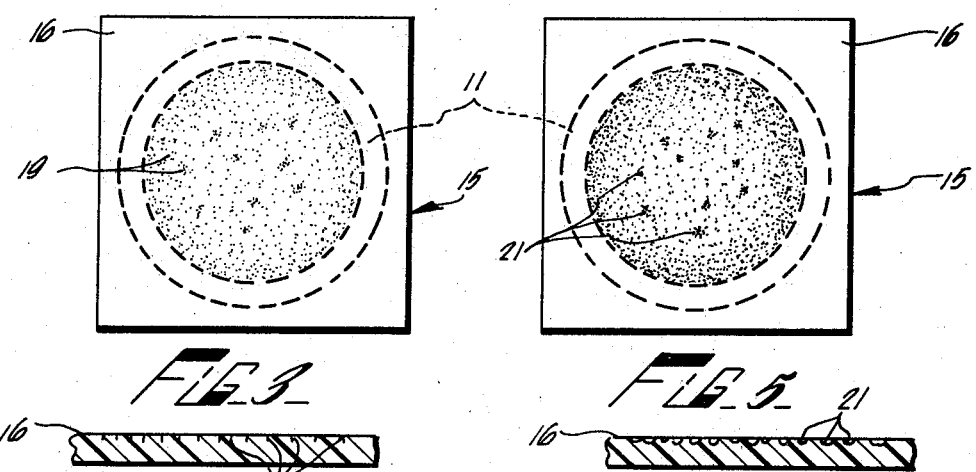
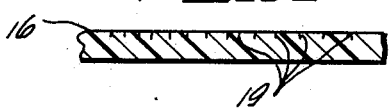
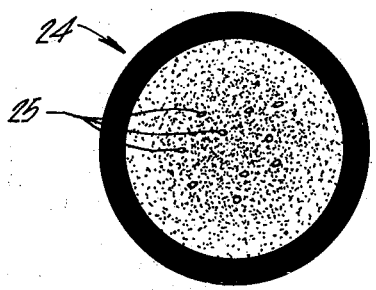

3,493,751
TRACK REGISTRATION ALPHA AUTORADIOGRAPHY
John H. Davies, Danville, Carl P. Ruiz, Fremont, and Howard A. Storms, Livermore, Calif., assignors to General Electric Company, New York, N.Y., a corporation of New York
Filed June 17, 1966, Ser. No. 558,490
Int. Cl. G01t *3/00, 5/00;* H01j *39/32*
U.S. Cl. 250—83
7 Claims

ABSTRACT OF THE DISCLOSURE

A process for producing autoradiographs of alpha-particle emitting objects is disclosed. Typically, a sheet of track-registration material is placed adjacent an object having alpha-particle emitting portions, maintained there for suitable period and then treated with an etchant. The etchant selectively dissolves damage tracks along parts traversed in the material by alpha particles. The tracks produce a visible image corresponding to alpha-emitting portions of the objects.

---

An autoradiograph is an image or record of radioactive material in an object, and is typically made by positioning a sheet of photographic film against the object. Various types of radiation from the object penetrate a sensitive emulsion on the film to form a latent image of radioactive areas of the object. The film is then chemically developed to make visible the latent image. This process is generally similar to the technique of producing a conventional X-ray radiograph, except that the autoradiographic object itself is the source of radiation, and a separate source of radiation is unnecessary. The resulting autoradiograph is useful in detecting and mapping the presence of areas in the object which are radioactive.

Photographic films adapted for radiography have several drawbacks which have limited and complicated the making and use of autoradiographs, and especially alpha-particle autoradiographs. Such films are normally light sensitive, and precautions must be taken to protect the film from exposure to light prior to completion of chemical development and fixing or stabilization. Darkroom facilities and personnel are thus typically required for film processing, and the film must be packaged and handled in a light-tight enclosure prior to processing.

Another problem with photographic film in certain applications is that it is non-selectively sensitive to many different kinds of energetic particles and electromagnetic radiation. Most films are directly sensitive to alpha and beta particles, and are also affected by neutrons, X-ray and gamma radiation, and the like, as photoelectrons and recoil protons which form track images are produced in the sensitive emulsion of the film by this kind of bombardment.

The lack of selective sensitivity of photograph film limits the production of autoradiographs which are sensitive to alpha particles and insensitive to beta particles, gamma rays, and the like. In some applications, the exposure resulting from non-alpha radiation may completely mask the alpha tracks, preventing detection and accurate mapping of an alpha-emitting source in the object.

The method of this invention overcomes these problems of conventional photographic film, and makes possible the generation of an autoradiograph which is substantially sensitive to alpha radiation alone; i.e., an alpha autoradiograph. Light shielding and darkroom processing is unnecessary, and the latent autoradiographic image is "developed" or made visible by processing with readily available chemicals in daylight. The method is inexpensive and simple to execute, and does not require special fixtures or skilled personnel.

Our method is based on a known process which is usually called "track etching". The track-etching process employs a homogeneous, solid-state detector material which may be a crystalline solid such as mica, or a non-crystalline substance such as inorganic glass or a polymeric plastic. The detector material is irradiated by charged particles, and damage tracks are created in the material by local alteration of the material structure along the particle trajectories. The damage tracks are then enlarged and made visible by application of a reagent which preferentially attacks the altered material along the damage track at a faster rate than it attacks the undamaged material around the track. A description of the track-etching process appears at page A1443 of "Physical Review" volume 133, number 5A (March 1964).

We have found that certain electrically insulating, homogeneous detector materials such as cellulose plastics register damage tracks when subjected to alpha radiation, but do not register beta- and gamma-radiation damage tracks. This damage-track selective sensitivity is exploited in the formation of alpha autoradiographs of an object which emits alpha particles, and which may also exhibit beta and gamma radiation. A damage-track response in these materials occurs only along the trajectories of alpha particles, and subsequent chemical processing of the latent image created by the damage tracks makes visible an image of the alpha-radiating portions of the object under examination.

This method of forming an alpha autoradiograph is especially useful in the examination of irradiated fuel materials from nuclear reactors. While beta-gamma autoradiographs are also useful in this application, an alpha autoradiograph yields additional uniquely valuable information on the distribution of alpha-emitting materials such as plutonium in the fuel. Beta-gamma autoradiographs yield information on the distribution of beta-gamma emitting fission products in the fuel.

Briefly stated, the invention is a process for making an autoradiograph of an object having portions which emit alpha particles. A substantially homogeneous, electrically insulating track-registration material is placed adjacent the alpha-emitting object, and preferably in face-to-face contact with the object. The material has the quality of being substantially insensitive to light, and further has a selective-sensitivity property of forming damage tracks only along paths in the material traversed by alpha particles when the material is irradiated by alpha, beta and gamma radiation. After exposure of the material to the alpha-emitting object, the material is etched with a chemical reagent which selectively attacks and enlarges the damage tracks. This etching forms craters or pits in the surface of the material wherever damage tracks are present, and the damage tracks are thereby made visible to form an autoradiographic image of the alpha-emitting portions of the object.

The material is washed after etching to remove the reagent, and the resulting autoradiograph is ready for immediate inspection. Alternatively, the autoradiograph may be used as a photographic negative from which a positive print is made using conventional photographic techniques. The pits or craters on the material form darkened areas which print as light areas in the photographic positive.

In a presently preferred form of the process, a sheet of cellulose nitrate is used as the track-registration material. Sodium hydroxide is a suitable reagent for selective attack of the damage material along the damage tracks.

The invention will be discussed in detail in terms of its application to autoradiographic examination of fuel pellets from a nuclear reactor, and with reference to the attached drawings, in which:

FIG. 1 is a perspective view of a portion of fuel pellet;

FIG. 2 is a perspective view of a sheet of track-registration material positioned against an end face of the fuel pellet;

FIG. 3 is a plan view of a face of the track-registration material which was in contact with the fuel pellet, with invisible damage tracks identified by light stippling;

FIG. 4 is an enlarged side view of a portion of the material shown in FIG. 3;

FIG. 5 is a plan view of the track-registration material after etching, with enlarged damage pits or craters being indicated by dark stippling;

FIG. 6 is an enlarged side view of a portion of the material shown in FIG. 5; and FIG. 7 is a plan view of a positive photographic print made by using the material shown in FIGS. 5 and 6 as a photographic negative.

Referring to the drawings, FIG. 1 shows a fuel pellet 10 of generally cylindrical form, and having a hollow, cylindrical outer casing or cladding 11 which surrrounds a fuel element 12. Such fuel pellets are commonly used in nuclear reactors, and a typical fuel element may include a blend of plutonium and uranium compounds. The fuel pellet has been cut across its longitudinal axis and polished to expose a smooth end face of the cladding and fuel element for radiographic examination.

In FIG. 2, a track-registration material such as a sheet 15 of cellulose nitrate is placed in face-to-face contact with the end face of fuel pellet 10. The positioning step is typically performed using conventional remote-handling apparatus (not shown) to avoid exposure of personnel to radioactivity. In some applications, it may be desirable to interpose a very thin (i.e., having a thickness less than the penetration range of alpha particles from the pellet) plastic absorber (not shown) between the end face of the fuel pellet and sheet 15 to prevent adherence of radioactive particles from the pellet on the sheet.

A face 16 of the cellulose-nitrate sheet is thus bombarded by alpha particles emitted by the plutonium in the fuel element, and is also irradiated by beta and gamma radiation from the fuel element. Cellulose nitrate and other cellulose-ester materials have the property of forming damage tracks along the paths of alpha particles which pass into the material from the fuel element. These materials, however do not form damage tracks from beta and gamma radiation.

Massive doses of beta-gamma radiation may degrade these plastics to the extent that they become somewhat brittle and more soluble in an eching reagent. However, individual beta-gamma damage tracks are not registered, and the effect of this type of radiation does not mask the registration of damage tracks formed by impinging alpha particles.

Alpha-particle damage tracks 19 are illustrated schematically by stippling and dashed lines in FIGS. 3 and 4. The damage tracks are very small, and are invisible to the naked eye or to an optical microscope. Thus, the damage-track stippling and dashed lines in FIGS. 3 and 4 are by way of explanation only and are not intended to show the actual appearance of the "exposed" track-registration material. The phantom outline of cladding 11 in FIGS. 3 and 5 is shown for orientation only, and no damage tracks will appear in the track-registration material which was positioned against the cladding unless the cladding is emitting alpha particles.

A typical alpha particle having an energy of say 4.5 mev. will penetrate the track-registration material to a depth of perhaps forty microns, and the resulting damage track will have a width in the range of about twenty to one-hundred angstroms. It will be appreciated that these tracks are too small to be seen with an ordinary microscope, although they can be detected through careful use of an electron microscope.

An etching reagent is then applied to face 16 of the exposed track-registration sheet of cellulose nitrate to enlarge the individual damage tracks. We have found that a six-normal aqueous solution of sodium hydroxide at approximately 60° centigrade is a satisfactory etching reagent, and provides satisfactory definition of the damage tracks in an etching period in the range of one to ten minutes. Damage-track pit or crater diameters between about two and five microns are convenient for subsequent projection or optical examination, and such tracks or craters are typically produced in an etching period of four to six minutes.

The etching rate can be adjusted by changing the temperature or the concentration of the etching reagent. The exact etching time is generally not critical, and need only be sufficient to produce sufficient damage-track enlargement that the resulting pits or craters are visible in good contrast when the sheet is viewed by transmitted light. Excessive enlargement from extended etching of the pits or craters is undesirable in most applications due to the resulting loss in image resolution and contrast. The reagent is removed at the end of the etching step by rinsing the track-registration sheet in water.

FIGS. 5 and 6 show individual pits or craters 21 after completion of the etching and rinsing steps. The craters are shown in a fairly dense, relatively uniform pattern around the periphery of the fuel-element image, and gradually shading off to lower densities as the center of the image is approached. Several isolated clusters of etched damage tracks also appear in the central area of the image. The processed track-registration material or autoradiograph thus indicates that alpha-emitting plutonium in the fuel element has tended to form in radially outer portions of the fuel element, with a few isolated fragments appearing in the central portion of the element. Non-homogeneity of the fuel blend or of plutonium formation is thus immediately detected, and the high resolution provided by the short-range alpha particles provides a precise picture of fuel-element composition, distribution and fine structure.

The processed track-registration material or autoradiograph may be used directly for visual examination, or may be used as a photographic "negative" from which a positive print is prepared. When viewed with transmitted light, the etched pits or craters appear as dark circular or cone-shaped areas in high contrast with the background of relatively transparent, undamaged material. The autoradiograph is thus very suitable as a photographic negative, and excellent enlargements are obtained by printing on a relatively high contrast printing paper of any conventional type. A short exposure time with overdevelopment will further improve the contrast in the positive print of the damaged areas to the undamaged background material.

A positive print 24 is shown in FIG. 7, and has a dark outer annular ring corresponding to the cladding on the fuel element. The portion of the track-registration material or autoradiograph which was in face-to-face contact with the cladding remains essentially clear after etching as no damage tracks are formed in that area. The positive print is therefore black in those areas where no damage tracks exist in the autoradiograph "negative." Light areas in the positive print, indicated schematically as regions 25 in FIG. 7, represent areas of high alpha radiation in the fuel pellet, as these regions are images of high-density pit or crater areas on the autoradiograph.

Thickness of the sheet of track-registration material is not critical, and can be selected to register damage tracks which extend only part way into the sheet (to form surface pits or craters after etching) or which extend entirely through the sheet (to form holes through the sheet after etching). As mentioned above, the range of alpha particles in these materials is quite short (typically about forty microns), and the sheet must therefore be very thin if through holes are to be formed. For most applications, a fairly thick sheet of say 0.010-inch thickness is preferred to provide sufficient stiffness for convenient handling by mechanical manipulators. Both pits and holes provide very satisfactory images, thick sheets with pits providing somewhat better contrast, and thin sheets with holes providing somewhat better resolution.

Materials other than cellulose nitrate are suitable for the track-registration material, and various cellulose esters have been investigated and found suitable. For example, sheets of cellulose acetate and acetate-butyrate form damage tracks in response to alpha-particle radiation. Cellulose nitrate, however, is preferred as it exhibits the highest sensitivity to damage-track formation for a given level of alpha-particle radiation.

While sodium hydroxide is a preferred etching reagent, other reagents which chemically etch (rather than dissolve) the track-registration material can be used. For example, potassium hydroxide, ammonium hydroxide, and sodium and potassium carbonates produce the desired etching effect. Etching time is typically a function of reagent temperature, and may vary from say 30 seconds at 70° C. to several hours at room perature.

Image quality in the finished autoradiograph is a function of "exposure"; i.e., the intensity of the radioactive source and the duration of contact between the object and the track-registration material. Good images are obtained with a damage-track density of about $10^8$ or $10^9$ tracks per square centimeter. Preferably, the damage-track density in heavily exposed regions of the image should be held in the range of about $10^5$ to about $10^{11}$ tracks per square centimeter.

While our method has been described in terms of its application to examination of an atomic-reactor fuel pellet, it is to be understood that this is only one of many possible uses for the invention. The invention has utility in many areas of non-destructive testing where it is desirable to determine the presence and distribution of alpha-particle-emitting substances in an object. The process is useful with any object which emits alpha particles, and is especially useful where it is desirable to register alpha emission selectively without registration of beta or gamma radiation from the same object. The above-described track-registration materials and etching chemicals are inexpensive and readily available, and the process can be carried out by inexperienced personnel. The materials are insensitive to light (in comparison to photographic emulsions which have been in common use in the past), eliminating the need for darkroom techniques and light-tight packaging.

What is claimed is:
1. A process for making an autoradiograph of an object having portions which emit alpha particles, comprising the steps of:
    (a) positioning a substantially homogeneous, electrically insulating track-registration material adjacent the object, the material being substantially insensitive to light and having a selective-sensitivity property of forming damage tracks only along paths in the material traversed by alpha particles when irradiated by alpha, beta and gamma radiation;
    (b) maintaining said material in position for a period sufficient to permit portions of the surface of the material to be penetrated by from about $10^5$ to about $10^{11}$ alpha particles per square centimeter; and
    (c) etching the material with a chemical reagent which selectively attacks and enlarges the damage tracks whereby the damage tracks are made visible to form an autoradiographic image of the alpha-particle-emitting portions of the object.

2. The process defined in claim 1 in which the track-registration material is a cellulose ester.

3. The process defined in claim 1 in which the track-registration material is selected from the group consisting of cellulose nitrate, cellulose acetate, and cellulose acetate-butyrate.

4. A process for making an autoradiograph of an object having portions which emit alpha particles, comprising the steps of:
    (a) positioning a sheet of cellulose nitrate adjacent the object, whereby damage tracks are formed along paths in the sheet traversed by alpha particles from the object;
    (b) maintaining said sheet in position for a period sufficient to permit portions of the sheet surface to be penetrated by from about $10^5$ to about $10^{11}$ alpha particles per square centimeter; and
    (c) etching the sheet of cellulose nitrate with a chemical reagent which selectively attacks and enlarges the damage tracks whereby the damage tracks are made visible to form an autoradiographic image of the alpha-particle-emitting portions of the object.

5. The process defined in claim 4 in which the chemical reagent is sodium hydroxide.

6. The process defined in claim 5 in which the sheet of cellulose nitrate is etched with an approximately six-normal aqueous solution of sodium hydroxide for a period in the range of about one to about ten minutes.

7. A process for making an autoradiograph of an object having portions which emit alpha particles, comprising the steps of:
    (a) positioning a sheet of cellulose nitrate adjacent the object, whereby damage tracks are formed along the paths in the sheet traversed by alpha particles from the object;
    (b) maintaining said sheet in position for a period sufficient to permit portions of the sheet surface to be penetrated by from about $10^5$ to about $10^{11}$ alpha particles per square centimeter;
    (c) etching the sheet of cellulose nitrate with a chemical reagent which selectively attacks and enlarges the damage tracks whereby the damage tracks are made visible to form an autoradiographic image of the alpha-particle-emitting portions of the object;
    (d) removing the reagent from the sheet of cellulose nitrate; and
    (e) forming a photographic print of the autoradiographic image by using the etched sheet of cellulose nitrate as a photographic negative.

References Cited

UNITED STATES PATENTS

| 2,733,353 | 1/1956 | Pirson | 250—65 |
| 3,282,756 | 11/1966 | Hawley | 250—65 X |
| 3,335,278 | 8/1967 | Price et al. | 250—83.1 |

OTHER REFERENCES

Tracks of Charged Particles In Solids, by Fleischer et al, from SCIENCE, vol. 149, No. 3682, July 23, 1965, pgs. 383–393.

ARCHIE S. BORCHELT, Primary Examiner

U.S. Cl. X.R.

250—65, 831